Patented May 13, 1952

2,596,852

UNITED STATES PATENT OFFICE 2,596,852

PERMANENTLY FLAVORED CHEWING GUM BASE

Robert Heggie, Garden City, N. Y.

No Drawing. Application July 14, 1950,
Serial No. 173,948

13 Claims. (Cl. 99—135)

This invention relates to chewing gum bases containing a permanent fixed flavor, and more particularly to permanently flavored co-polymers of vinyl acetate and equivalent unsaturated compounds with unsaturated molecules having flavor characteristics.

It is an object of this invention to produce a chewing gum base having a permanent pleasing flavor.

It is also an object of this invention to co-polymerize an unsaturated molecule, for example, vinyl acetate with an unsaturated molecule having a pleasing flavor, to produce a co-polymer which contains permanent pleasing flavor.

The ordinary preparation of chewing gum bases utilize resins admixed with elastomers flavored by the addition of a flavor containing compound. It has also been proposed that a single molecular constituent having the properties of the usual resin-elastomer blend may be used in a chewing gum base and to which flavor constituents are commonly added.

My invention differs from prior art in that I have produced a co-polymer containing a permanent flavor. In short, I have invented novel flavor-containing co-polymers. The flavor of my novel co-polymers are permanent and by permanent I mean a duration associated with the useful life of chewing gum when chewed, which duration is about one hour and usually a plurality of hours.

The novel permanently flavored co-polymers of my invention are especially suitable in the manufacture of chewing gum bases. Such bases comprise waxes, vegetable oils, lecithin and many other ingredients, depending upon the various manufacturers' formulae. It is therefore, to be understood that the use of my novel flavored co-polymers is not to be restricted to any particular chewing gum base formula, nor to any proportions of ingredients therein.

The fixation of a permanent flavor in my novel co-polymers is illustrated by the fact that washing of the prepared co-polymer with hot water at 175° F., followed by drying for 2 to 3 hours at 185° F. does not remove the flavor therefrom. However, in the case of the mechanical mixing of polyvinyl acetate polymer with citral, substantially all the flavor was removed when like conditions of washing and drying were employed.

I have found that vinyl acetate may be co-polymerized with unsaturated compounds having flavoring qualities, for example, anethol, to yield novel co-polymers having a pleasing flavor. These polymers are particularly suitable for use in chewing gum base compositions inasmuch as they retain the flavor of the flavored monomer in a new combination for relatively long periods of time.

Flavoring substance having at least one unsaturated bond may be used as the flavor contributing molecule, and include citral, d-limonene, and the like. The amount of flavoring substance I add may vary from less than about 1 per cent to about 8 per cent with 1 to 2 per cent being sufficient for effective results.

The flavored co-polymers of my invention are desirably of a molecular weight of 3,000–10,000, are non-toxic, and are soft at mouth temperature. These polymers also take up water to about 25–35 per cent and are, therefore, suitable for use in chewing gum bases.

The flavored co-polymers of my invention may be prepared according to the following general formula in which the parts given are by weight:

*Formula A*

| | Parts |
|---|---|
| Vinyl acetate (distilled) | 20–35 |
| Citral, d-limonene, anethol or equivalent flavor monomer | 1– 8 |
| Tricalcium phosphate | 0.5– 1 |
| Benzoyl peroxide | 0.5– 1 |
| Acetaldehyde | 2– 4 |
| Water | 40–75 |

As a specific example of the procedure used, a stainless steel reactor equipped with an agitator, pressure gauge, thermometer and safety valve is charged with water and tricalcium phosphate. These ingredients are agitated and a solution comprising vinyl acetate, benzoyl peroxide and acetaldehyde is added thereto. The reactor is heated to 150° F., equivalent to 20–25 lbs. per square inch pressure, whereupon an exothermic reaction occurs. The temperature is then gradually increased to 215° F. and a maximum pressure of 60–80 pounds per square inch. On the completion of the reaction the temperature and pressure drops sharply, whereupon heat is again applied at 212° F. for about 15 minutes, after which the mass is allowed to cool to room temperature. Total time required for the reaction is between 45 and 65 minutes.

The prepared co-polymer is washed free of unreacted vinyl acetate and any other free monomer, acetaldehyde, and tricalcium phosphate by using hot water of about 170°–175° F. The washed co-polymer is then dried at 180°–185° F. with stirring for 2–3 hours to remove excess water to produce a co-polymer ready for use.

A specific example of a co-polymer prepared as indicated above was prepared with U. S. P. citral (United States Pharmacopoeia grade). The washed and dried product contained 2 per cent citral and had a pleasing flavor. The co-polymers are non-toxic, elastic, and otherwise suitable or adaptable for use in a chewing gum base.

In general, the washed and purified flavored co-polymer of this invention comprises from about 1 to about 5 per cent of flavor containing monomer.

I claim:

1. A chewing gum base comprising masticable ingredients and a permanently flavored masticable ingredient which is a copolymer of vinyl acetate with a flavored compound containing an ethylenic bond.

2. A chewing gum base comprising masticable ingredients and a permanently flavored masticable ingredient which is a copolymer of vinyl acetate with an essential oil containing an ethylenic bond.

3. A chewing gum base comprising masticable ingredients and a permanently flavored masticable ingredient which is a copolymer of vinyl acetate with an essential oil containing an ethylenic bond, said copolymer consisting of 92-99% vinyl acetate and from 1-8% of the essential oil.

4. A chewing gum base comprising masticable ingredients and a permanently flavored masticable ingredient which is a copolymer of vinyl acetate with an essential oil containing an ethylenic bond, said copolymer consisting of 92-99% vinyl acetate and from 1-8% of the essential oil; and the copolymer having a molecular weight of from about 3,000 to 10,000.

5. A chewing gum base comprising masticable ingredients and a permanently flavored masticable ingredient which is the copolymer of vinyl acetate with citral.

6. A chewing gum base comprising masticable ingredients and a permanently flavored masticable ingredient which is the copolymer of vinyl acetate with d-limonene.

7. A chewing gum base comprising masticable ingredients and a permanently flavored masticable ingredient which is the copolymer of vinyl acetate with anethol.

8. A chewing gum base comprising masticable ingredients and a permanently flavored masticable ingredient which is the copolymer of 92-99% vinyl acetate, and from 1-8% of citral.

9. A chewing gum base comprising masticable ingredients and a permanently flavored masticable ingredient which is the copolymer of 92-99% vinyl acetate, and from 1-8% of d-limonene.

10. A chewing gum base comprising masticable ingredients and a permanently flavored masticable ingredient which is the copolymer of 92-99% vinyl acetate, and from 1-8% anethol.

11. A chewing gum base comprising masticable ingredients and a permanently flavored masticable ingredient which is the copolymer of 92-99% vinyl acetate, and from 1-8% of citral, and said copolymer having a molecular weight of from about 3,000 to 10,000.

12. A chewing gum base comprising masticable ingredients and a permanently flavored masticable ingredient which is the copolymer of 92-99% vinyl acetate, and from 1-8% of di-limonene, and said copolymer having a molecular weight of from about 3,000 to 10,000.

13. A chewing gum base comprising masticable ingredients and a permanently flavored masticable ingredient which is the copolymer of 92-99% vinyl acetate, and from 1-8% anethol, and said copolymer having a molecular weight of from about 3,000 to 10,000.

ROBERT HEGGIE.

REFERENCES CITED

The following references are of record in the file of this patent:

UNITED STATES PATENTS

| Number | Name | Date |
|---|---|---|
| 2,129,478 | Rohm | Sept. 6, 1938 |
| 2,306,411 | Schoenfeld | Dec. 29, 1942 |
| 2,356,974 | Clifford | Aug. 29, 1944 |
| 2,413,294 | Curtis | Dec. 31, 1946 |